(No Model.)
W. J. STAHR.
CAR BRAKE.
No. 491,381. Patented Feb. 7, 1893.
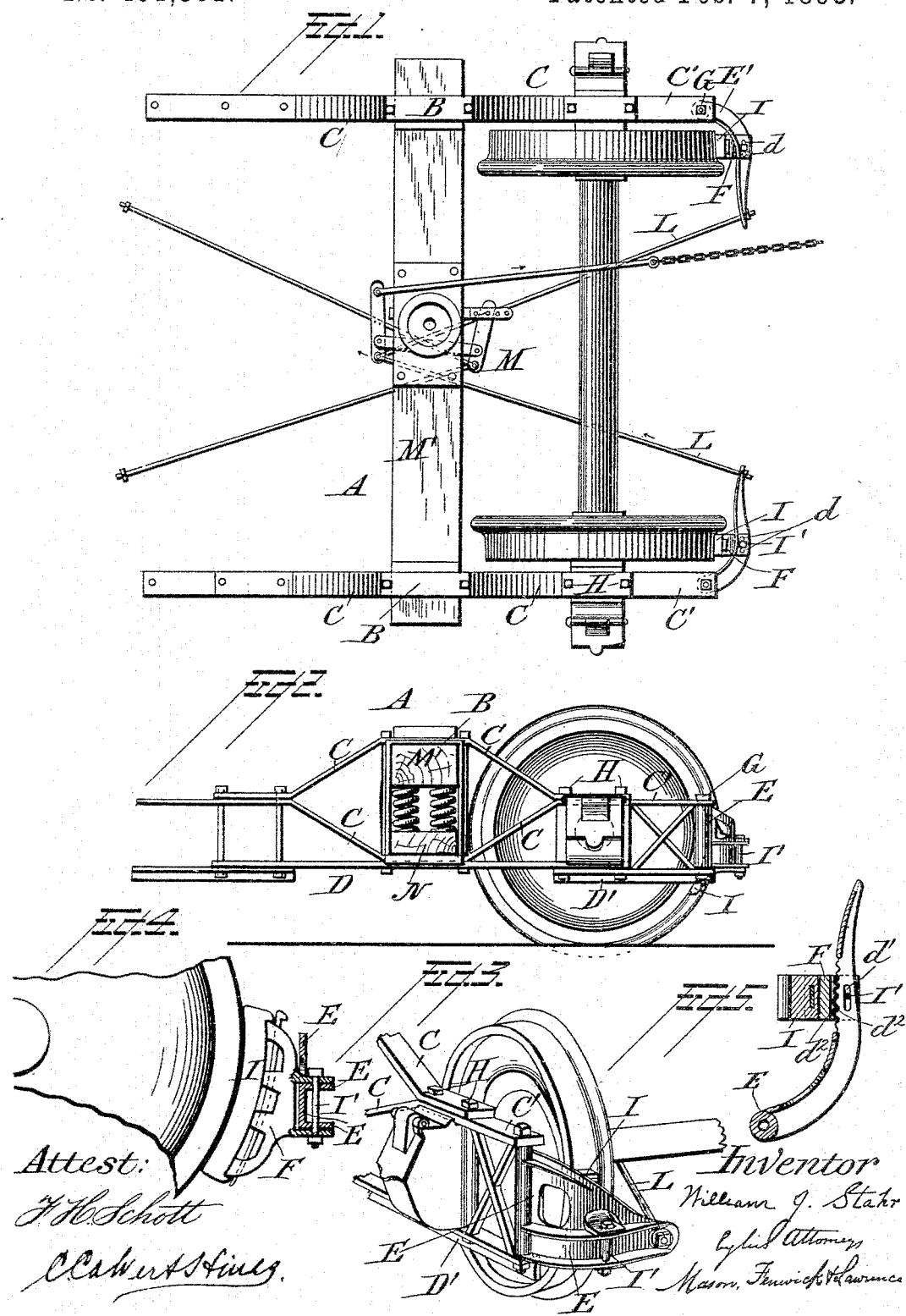
Attest:
F. H. Schott
C. Calwert Hines
Inventor
William J. Stahr
by his Attorneys
Mason, Fenwick & Lawrence

UNITED STATES PATENT OFFICE.

WILLIAM J. STAHR, OF BLOOMSBURG, PENNSYLVANIA.

CAR-BRAKE.

SPECIFICATION forming part of Letters Patent No. 491,381, dated February 7, 1893.

Application filed November 23, 1892. Serial No. 452,950. (No model.)

*To all whom it may concern:*

Be it known that I, WILLIAM J. STAHR, a citizen of the United States, residing at Bloomsburg, in the county of Columbia and State of Pennsylvania, have invented certain new and useful Improvements in Rail Car-Brakes and Trucks Therefor; and I do hereby declare the following to be a full, clear, and exact description of the invention, such as will enable others skilled in the art to which it appertains to make and use the same.

My invention consists in a novel construction and arrangement of parts in a rail car brake, whereby a curved or supporting lever carrying rigidly attached a brake shoe holder, which holder has a brake shoe firmly fastened to it, can be attached by its outer end to the frame of a car truck at a point in line with or in rear of the periphery of the wheel and by its inner end attached to a connecting rod of the power braking mechanism, and, thus applied, is adapted to swing horizontally and throw the brake shoe on and off the periphery of a car wheel, the brake shoe although firmly attached to its holder and to the swinging lever through said holder, is caused to bear parallel upon the periphery of the wheel.

It also consists in a novel construction of the side beams of rail car trucks, in combination with a novel construction and arrangement of the lever support carrying a brake shoe holder and brake shoe attached to said holder, and the operating brake levers or mechanism, whereby, through the connecting rods of said mechanism, the lever supports and brake shoe holders, with shoes attached to them, are capable of swinging horizontally toward and from the wheel, and the shoes being brought parallel with the periphery of the wheel, and the whole being operated by a brake mechanism supported by the bolster or spring beam of the truck and by a brake mechanism supported by the bolster or spring plank of the truck, and thus great durability and effectiveness of action with simplicity and safety are secured, and all necessity of supporting the brake by the car body and of having the levers by which the power upon the brake shoes is directly applied, being extended across from one side frame beam to the other is avoided, and a very symmetrical and practically operating, as well as substantial construction and arrangement of parts for a brake mechanism, secured.

My invention also consists in a novel construction of the brake shoe holder upon its support, whereby it is adapted for being readily moved sidewise on said support, and set away from the flange of the wheel, so as to allow for the lateral motion of the wheel when the brasses become worn.

In the accompanying drawings, Figure 1 is a plan view of a portion of a railway car truck, and a brake constructed in accordance with my invention. Fig. 2 is a side elevation of the same. Fig. 3 is a broken perspective view showing more plainly the construction of the rear ends of the side beams, and the improved support for the brake shoe holder and shoe. Fig. 4 is a broken view partly in vertical section, and Fig. 5 is a detail horizontal sectional view of the brake shoe, its holder and the support thereof.

A represents a rail car truck having side beams B of the regular diamond form, with arch bars C. In order to carry out my invention, one of the arch bars of each of the side frames is extended backward on substantially the same horizontal plane as the top of the axle box as indicated at C', either by manufacturing the same with the extension thereon, or by connecting a short iron piece (preferably angle or channel iron) to it by box bolts H; and in the same manner the tie bar D is extended backward parallel with the extension of the arch-bar either in its manufacture or by connecting short iron piece, as indicated at D', to it. The supports E E' are hung between the extended portions C' and D' of the truck beams, by vertical pivot bolts G. These supports are, in side view, of approximately V-form, in order to secure a broad, rear supporting and sustaining tubular end for bearing the strain while applying the brake, and have the free forward connecting end of the support low enough down to apply the brake shoe holder and shoe in proper position with respect to a horizontal plane about through the center of the car wheel, and are curved inwardly from their pivotal portions, substantially as shown, so as to bring the brake shoe holders F, and the shoes I, parallel with the peripheries of the car wheels when the brake is applied for stopping said wheels. These metal supports constitute the supports of the shoe holders and shoes. The shoes I are keyed to the holders F, and, by the arrangement described, the shoes can be drawn up evenly and effectively against the peripheries of the wheels by connecting rods L of an ordinary brake mechanism M of a rail car, while such mechanism is hung from the bolster M', or supported by the spring plank N. The rods L are connected to the inner free ends of the supports E of the brake shoe holders F, as represented, and the said supports thus afford considerable leverage power and have a horizontal swinging movement on their pivotal bolts. By this improved construction, all necessity of providing supports for the brake on any other part of the car or car truck than the side beam of the truck, is avoided, and, furthermore, the disadvantages of the now generally used car brake are avoided, as the necessity of using vertically moving beams is dispensed with, and therefore the danger of throwing cars off the track by the brake beam dropping under the wheels is avoided.

The casting forming the brake shoe holder is so constructed that the standard brake shoe can be used on it, and the same connected to the holder by a bolt I', and readily changed when cars are in service. In order to provide for easily moving the brake shoe holders sidewise away from the flanges of the wheel, and thus allow for the lateral motion of the wheel as the brasses become worn away, two or more holes $d$ are provided for adjusting the bolts I'; or an oblong slot $d'$ instead of the holes may be used, and the holder and the lever arm of the supporting device might be corrugated as indicated at $d^2$.

It is obvious that the nut of bolt I' can be slackened and the brake shoe holder slipped laterally away from the flange of the car wheel, as occasion may require, and then secured by tightening up the nut.

While my invention is applied to the greatest advantage in the manner represented in Fig. 1, it is not confined to two brakes operated simultaneously, as a single brake operated as described may be used, as deemed desirable.

What I claim as my invention is:—

1. In a car brake, a curved brake holder and support E of approximately V-form, and having a vertical tubular portion at its broad end of sufficient length to allow of the extensions of the tie bar and arch-bar of the side frame of the truck being run parallel with each other on substantially the planes of the top and bottom of the axle box for their whole length beyond the axle box; said tubular portion being adapted to be located as far back as, or beyond, the periphery of the wheel, and confined by a vertical-pivot clamping bolt passed through the upper bar, tubular portion of the support and the lower tie bar, so as to give great sustaining power under the great strains thrown upon it when applying the brake, and thus avoid the necessity of employing other supports than the side beam for the brake shoe, said support carrying a rigidly connected brake shoe holder and a brake shoe, and being adapted to swing on the vertical pivot, and, in swinging horizontally, bring the shoe properly upon the periphery of a car wheel, substantially as described.

2. The curved brake shoe holder and support of approximately V-form, and having a vertical tubular portion at its broad end, and adapted for carrying a shoe holder and shoe, and by its tubular end portion to be connected to the side frame beam of a truck by setting it between the extensions of said beam and passing a bolt down through the beam and the tubular portion of the support, substantially as described.

3. The combination with the side beam of a car truck having extensions beyond the axle box on planes of the top and bottom of said box, of the curved brake shoe holder and support of approximately V-form and having a tubular broad end, and carrying a shoe holder and shoe, and applied on the extensions of the side beam, in combination with a brake lever mechanism suspended from a bolster or spring plank of the truck, and connected directly by rods L with the brake shoe support and holder, substantially as described.

4. The brake adapted to swing horizontally toward and from the periphery of a car wheel, and a brake shoe holder attached to its support and adapted to be moved sidewise away from the flange of the wheel, substantially as described.

In testimony whereof I hereunto affix my signature in presence of two witnesses.

WILLIAM J. STAHR.

Witnesses:
T. J. VANDERSLICE,
J. C. RUTTER, Jr.